US012626178B2

(12) United States Patent　　　　(10) Patent No.:　US 12,626,178 B2

Gentinetta et al.　　　　　　　　　(45) Date of Patent:　　May 12, 2026

(54) QUANTUM COMPUTING BASED KERNEL ALIGNMENT FOR A SUPPORT VECTOR MACHINE TASK

(71) Applicant: INTERNATIONAL BUSINESS MACHINES CORPORATION, Armonk, NY (US)

(72) Inventors: Gian Gentinetta, Chavannes-près-Renens (CH); David Sutter, Zurich (CH); Stefan Woerner, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 877 days.

(21) Appl. No.: 18/047,397

(22) Filed: Oct. 18, 2022

(65) Prior Publication Data

US 2024/0135226 A1　　Apr. 25, 2024

(51) Int. Cl.
*G06N 10/60*　　　　(2022.01)

(52) U.S. Cl.
CPC .................................... *G06N 10/60* (2022.01)

(58) Field of Classification Search
CPC ...................................................... G06N 10/60
USPC .......................................................... 706/12
See application file for complete search history.

(56) References Cited

FOREIGN PATENT DOCUMENTS

| | | |
|---|---|---|
| EP | 3948689 A1 | 2/2022 |
| WO | 2020201002 A1 | 10/2020 |

OTHER PUBLICATIONS

Feiping Nie, Wei Zhu, Xuelong Li, Decision Tree SVM: An extension of linear SVM for non-linear classification, Neurocomputing, vol. 401.*
Numerical evidence against advantage with quantum fidelity kernels on classical data, Slattery et al., Nov. 29, 2022 (Year: 2022).*
Quantum Kernel Alignment with Stochastic Gradient Descent, Gentinetta et al., 2023 (Year: 2023).*
The complexity of quantum support vector machines, Gentinetta, 2022 (Year: 2022).*
Glick et al., "Covariant quantum kernels for data with group structure", arXiv.2105.03406v2 [quant-ph] Mar. 21, 2022, <kptemme@IBM.com>, 18 pgs.
Hubregtsen et al., "Training Quantum Embedding Kernels On Near-Term Quantum Computers", arXiv.2105.02276v1 [quant-ph] May 5, 2021, 20 pgs, <thubregtsen@zedat.fu-berlin.de>.

(Continued)

*Primary Examiner* — Austin Hicks
(74) *Attorney, Agent, or Firm* — Eric W. Chesley

(57)　　　　　　ABSTRACT

Described are techniques for optimizing a quantum kernel for a support vector machine task. The techniques include receiving, by digital processor, a set of training data, each member of the set representing a data vector (x) and a label (y) identifying the respective member to be part of either a first class or a second class The techniques further include providing, by the digital processor, the quantum kernel comprising a set of unitary operations adapted for acting on a zero state of qubits of a universal quantum circuit The techniques further include performing, by a quantum processor comprising a set of interlinked quantum circuits, an alignment of the quantum kernel using an optimization algorithm based on the set of training data on a primal problem approach of the support vector machine task.

18 Claims, 12 Drawing Sheets

100

(56) References Cited

OTHER PUBLICATIONS

Liu et al., "SimpleMKKM: Simple Multiple Kernel K-means" Copyright 2020 by authors, arXiv:2005.04975v2 [cs.LG] May 12, 2020, 10 pgs.

No Author., "Quantum Kernel Alignment with Qiskit Runtime", Jun. 24, 22, 3 pgs, <https://qiskit.org/documentation/partners/qiskit_ibm_runtime/tutorials/qka.html>.

Qiskit., "Pegasos Quantum Support Vector Classifier", 2 pgs, Accessed on Oct. 10, 2022, <https://qiskit.org/documentation/machine-learning/tutorials/07_pegasos_qsvc.html>.

Shwartz et al., "Pegasos: Primal Estimated sub-GrAdient SOlver for SVM", School of Computer Science an dEngineering, The Hebrew University of jerusalem, Israel, Accessed on Oct. 10, 2022, 26 pgs.

* cited by examiner

100

102
Receive, by a digital processor, a set of training data

104
Provide, by the digital processor, a quantum kernel

106
Perform, by a quantum processor, an alignment of the quantum kernel using an optimization algorithm

Figure 2:
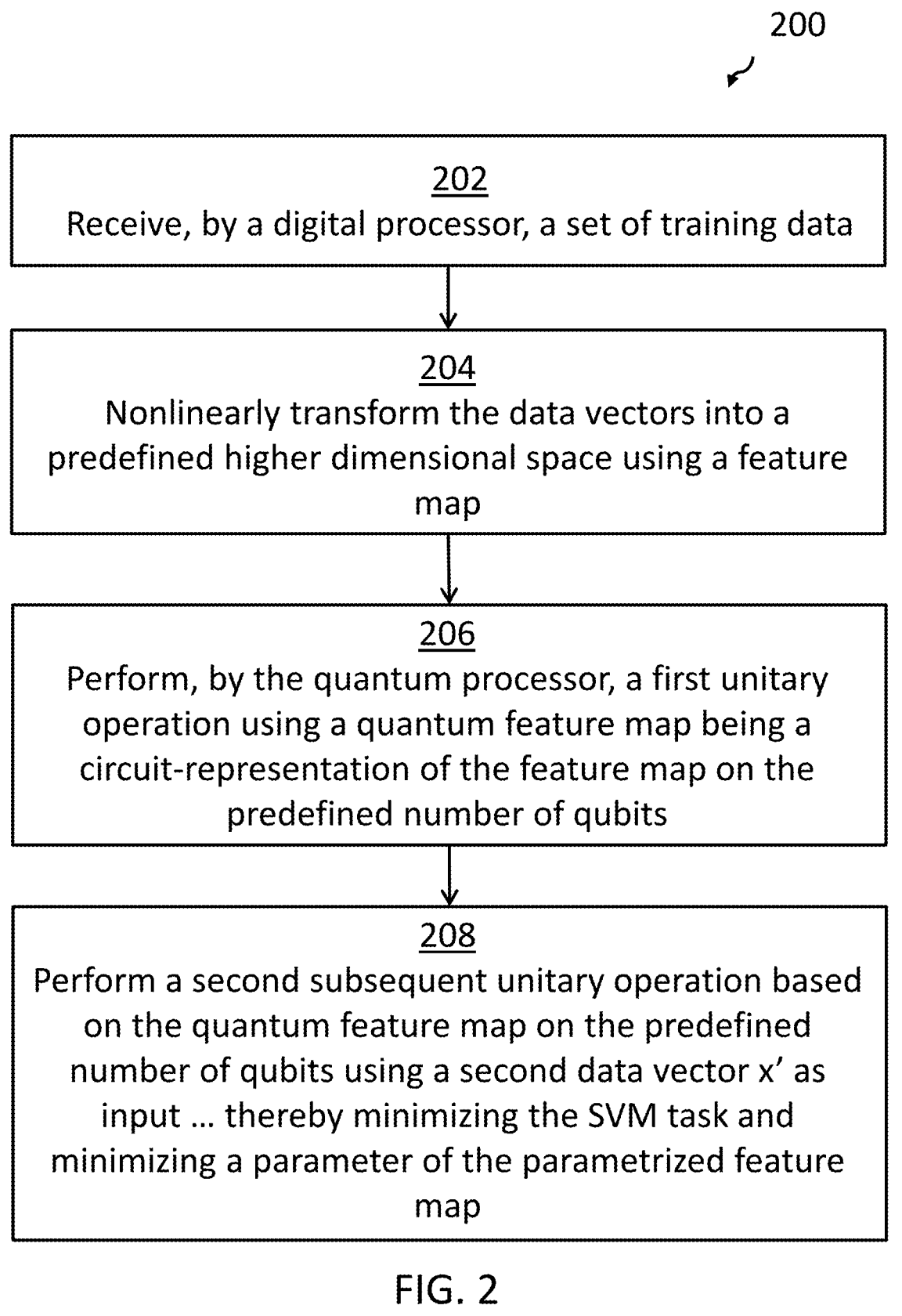

200

202
Receive, by a digital processor, a set of training data

204
Nonlinearly transform the data vectors into a predefined higher dimensional space using a feature map

206
Perform, by the quantum processor, a first unitary operation using a quantum feature map being a circuit-representation of the feature map on the predefined number of qubits

208
Perform a second subsequent unitary operation based on the quantum feature map on the predefined number of qubits using a second data vector x' as input ... thereby minimizing the SVM task and minimizing a parameter of the parametrized feature map

702 training data
(x, y)

704 model
f(x, θ) = ^y

706 loss function
ℓ (y, ^y)

710 update
θ

708 gradients
$\nabla_\theta \ell (y, F(x, \theta))$

800

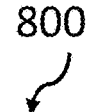

---

1: inputs:

2: training data $T = \{ x_1, x_2, \dots x_M \}$

3: labels $L = \{ y_1, y_2, \dots y_M \}$

4: regularization parameters $C \in \mathbb{R}^+$

5: pseudo-Kernel of the form $k_{\theta_1,\theta_2}(x, x') = |\langle \psi_{\theta_2}(x) | \psi_{\theta_1}(x') \rangle|^2$ 6: initial kernel paramaters $\theta_1, \theta_2 \in \mathbb{R}^d$ 7: number of steps $\tau \in \mathbb{N}$ 8: number of iterations $\tau_{in} < \tau$

9:

10: for $t = 1, 2, \dots, \tau$ do

11:     choose $i(t) \in \{1, \dots, M\}$ uniformly at random

12:     if $y_{it} C/t \sum_{s=1}^{t-1} y_j \alpha_t k_{\theta(s),\theta}(x_{i,t}, x_j) < 1$ then

13:        $\alpha_t \leftarrow 1$

14:        if $t > \tau_{in}$ then

15:           $f(\theta) \leftarrow -y_{it} C/t \sum_{s=0}^{t-1} y_j \alpha_t k_{\theta(s),\theta(t)}(x_{i(t)}, x_j)$ 16:           $\theta_{t+1} \leftarrow$ perform minimization step on $f(\theta)$ around $\theta$,
                  e.g., using SPSA 17:        else

18:           $\theta_{t+1} \leftarrow \theta_t$

19:        end if

20:     else

21:        $\alpha_t \leftarrow 0$

22:        $\theta_{t+1} \leftarrow \theta_t$

23:     end if

24: end for

FIG. 8

$$k(x, x') = \text{tr} \left[ |\psi(x')\rangle \langle \psi(x')| \ |\psi(x)\rangle \langle \psi(x)| \right]$$

$$= |\langle \psi(x')| \ |\psi(x)\rangle|^2$$

$$= |\langle 0| \ \mathcal{E}(x')^\dagger \ \mathcal{E}(x) \ |0\rangle|^2$$

Figure 11A:
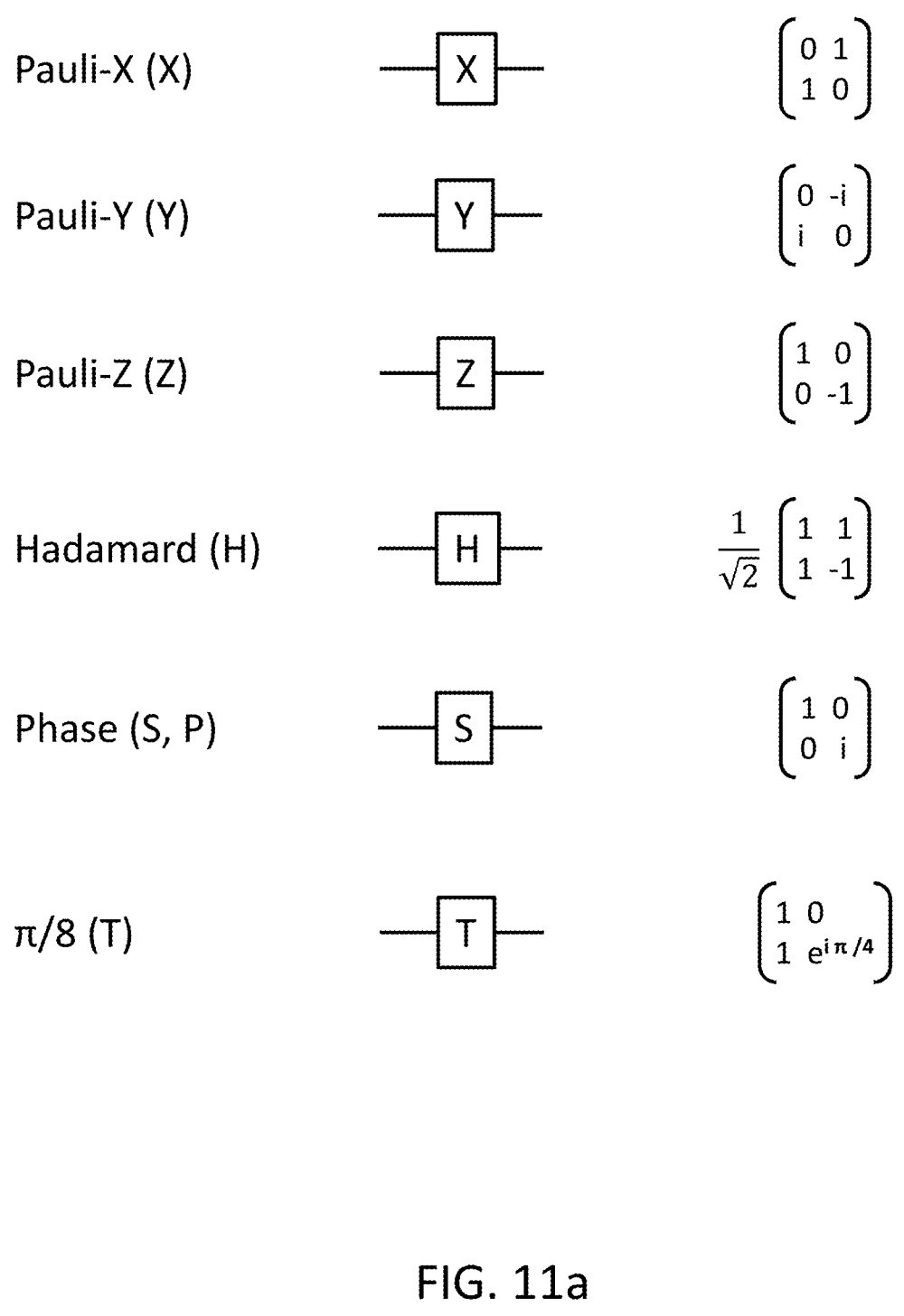

Pauli-X (X) $\boxed{\text{X}}$ $\begin{pmatrix} 0 & 1 \\ 1 & 0 \end{pmatrix}$

Pauli-Y (Y) $\boxed{\text{Y}}$ $\begin{pmatrix} 0 & -i \\ i & 0 \end{pmatrix}$

Pauli-Z (Z) $\boxed{\text{Z}}$ $\begin{pmatrix} 1 & 0 \\ 0 & -1 \end{pmatrix}$

Hadamard (H) $\boxed{\text{H}}$ $\frac{1}{\sqrt{2}} \begin{pmatrix} 1 & 1 \\ 1 & -1 \end{pmatrix}$ Phase (S, P) $\boxed{\text{S}}$ $\begin{pmatrix} 1 & 0 \\ 0 & i \end{pmatrix}$ $\pi/8$ (T) $\boxed{\text{T}}$ $\begin{pmatrix} 1 & 0 \\ 1 & e^{i\pi/4} \end{pmatrix}$

| 1206 receiver for training data |

| 1208 quantum processor |

| 1202 digital processor(s) |

| 1204 memory |

1300

QUANTUM COMPUTING BASED KERNEL ALIGNMENT FOR A SUPPORT VECTOR MACHINE TASK

BACKGROUND

The present disclosure relates generally to solving a support vector machine task using quantum computing, and more specifically, to optimizing a quantum kernel for a support vector machine task.

Quantum computing remains one of the hottest topics in computer science, the industry and in research. Classical digital computers and/or processors are slowly reaching their physical limitations, so research is looking for new ways to address mathematical and other problems that cannot be solved by classic von-Neumann machines due to the physical limitations in terms of structure size, power consumption, and ultimately speed of processing.

Quantum computing is thus one of the promising areas to reach quantum supremacy, which can be a real advantage in addressing very complex competition or tasks in reasonable times. As is well known, conventional computers encode process information in bits, i.e., "1"s and "0"s. Quantum computers, on the other hand, are based on so-called qubits which operate according to two key principles of quantum physics: superposition and entanglement. Superposition describes a situation that each qubit can represent both a "1" and a "0" inference between possible outcomes for an event. Entanglement means that qubits in superposition can be correlated with each other in a non-classical way. For example, the state of one qubit, whether it is a "1", or a "0", or both, can depend on the state of another qubit, and that there is more information contained in qubits when they are entangled.

In general, a quantum state is the mathematical description of the state of an atomic or subatomic-size system. This is described as a vector in a vector space over complex numbers, popularly known as the Hilbert space. A quantum state can thereby describe any properties of the quantum particle or system of quantum particles (e.g., the position, momentum, quintessential phenomenon like quantum spins, and so on). Some of these properties are continuous variables and are therefore represented by vectors in the infinite-dimensional Hilbert space; position and momentum as variables are examples of this. However, other properties such as the spin of a particle can only assume definitive many quantized values and are therefore finished-dimensional. For example, the spin-part of the state of a quantum system with "n" electrons can be a state inside a $2^n$ dimensional Hilbert space. Hence, the Hilbert space for "n" qubit quantum computer scales as $2^n$. Intuitively, each qubit in a quantum computer is not averse to a bit in the classical digital computer system. However, several qubits together in a system can explore a full "n"-dimensional Hilbert space instead of requiring $2^n$ classical bits to do the same. Hence, superposition and entanglement are two unique quantum properties that qubits possess over their classical counterparts.

However, transposing known problems to be solved into the world of quantum computers remains a major challenge, as the approach is so very different compared to classical digital processors. Therefore, specialists are constantly looking for problems that can be explored and practically studied with the currently available quantum computing systems. One of the promising fields is related to problems in the field of support vector machines.

Support vector machines in the classical context are well known for their ability to classify n-dimensional data points—each being represented by an n-dimensional vector—in two or more classes, even if the data points cannot be linearly separated. In a simple case, only two classes are shown for the support vector machine classifier. The support vector machine solution then addresses the trade-off between accurately predicting the true label (e.g., the exact class of a point), and maximizing the orthogonal distance (court margin) between the two classes. Once trained, the classification function can be applied to classify previously unseen data drawn from the same probability distribution. Hence, support vector machines are able to implement non-linear decisions in the original data space by transforming the input vector with a non-linear feature map, which transforms the original n-dimensional feature space in a higher dimensional space to find a hyper-plane in that higher dimensional space for the separation of the original data points into the two classes.

It is known that these optimization machine-learning problems can be solved—using the well-known "kernel trick"—a positive semidefinite kernel function. Typically, a maximization task has to be solved.

On the other side, several approaches have been made to transform such a problem into the world of quantum computing in order to study useful kernels, or better kernel functions. While such, functions are well known in classical computing, there are only heuristic approaches when using quantum computing devices.

Some documents are known in this field: document WO 2020/201002 A1 describes a method, a system, and a computer program product for quantum feature: alignment using a hybrid classical-quantum computing system. An embodiment of the method for hybrid classical-quantum decision maker training includes receiving training data set and selecting, by a processor, a sampling of objects from the training set. Furthermore, the method comprises applying a set of quantum feature maps to the selected objects by a quantum process. Furthermore, the document titled "SimpleMKKM: Simply Multiple Kernel K-means", by Xinwang Liu, En Zhu, Jainyuan Liu, Timothy Hospedales, Yang Wang and Meng Wang, published by School of computers, national university of defense technology Edinburgh University, Hefei University of technology with a correspondence address xinwangliu@nudt.edi.cn describes a comparatively simple, yet effective multiple kernel clustering algorithm, termed simple multiple-kernel k-means. It extends the widely used supervised: alignment criterion to multi-kernel clustering.

However, trying to solve support vector machine tasks using quantum gates have remained in the theoretical area and practical approaches are missing for kernel alignments using quantum vector support machines. Hence, there remains a need to find a practical solution for kernel alignment using a quantum vector support machine in order to provide a contribution to this field of quantum machine-learning.

SUMMARY

According to one aspect of the present disclosure, a computer implemented method for optimizing a quantum kernel for a support vector machine task comprises receiving, by a digital processor, a set of training data, each member of the set of training data representing a data vector (x) and a label (y) identifying the respective member to be part of either a first class or a second class. The computer implemented method further comprises providing, by the digital processor, the quantum kernel comprising a set of unitary operations adapted for acting on a zero state of qubits of a universal quantum circuit. The computer implemented method further comprises performing, by a quantum processor comprising a set of interlinked quantum circuits, an alignment of the quantum kernel using an optimization algorithm based on the set of training data on a primal problem approach of the support vector machine task.

The proposed method for optimizing a quantum kernel for a support vector machine task offers multiple advantages, technical effects, contributions, and/or improvements:

Solving a classification problem with a support vector machine can advantageously be done with quantum computation using a quantum kernel. The proposed method relies on using a quantum computer for calculating the quantum kernel. Since the quantum computer—in contrast to classical computers—performs the calculation on the quantum level by utilizing qubits, the high-dimensional calculation in the Hilbert space can be performed very effectively. In contrast to embodiments of the present disclosure, a classical computation would need a mathematical description of the quantum problem (e.g., a matrix representation) to solve the support vector machine problem, which is time and resource consuming.

Since the quantum calculation of a given quantum kernel can be done very efficiently, it is possible to test many quantum kernels within a short period of time. Thus, it is straightforward to find an optimal kernel for a given problem that produces reliable results for the classification with only minimal false identifications. Due to the fast algorithm, even large problems can be solved within a reasonable time frame.

Furthermore, the kernel alignment implemented in some embodiments reduces the time needed for the training significantly. Therefore, less training data is needed to achieve the same result of accuracy.

Finally, since the support vector machine is applicable to various problems, some embodiments are applicable in a broad range of technology.

In the following, additional embodiments applicable to the method will be described.

According to one advantageous embodiment of the method, the optimization algorithm can be a PEGASOS (primal estimated sub-gradient solver for a support vector machine) algorithm, which, when applied to a primal problem approach, includes two minimizations. Otherwise, in the dual formulation of the support vector machine, a maximization followed by a minimization has to be applied, which makes a parallel optimization very challenging. In contrast hereto, the combined minimizations as a min-min-problem can be solved in parallel. There is no need to wait until the maximization is done before the minimization can start.

According to another advantageous embodiment of the method, the data vectors (x) of the set of training data can be non-linearly separable data vectors by using the support vector machine. The data vectors (x) represent points in the feature space and the two classes are not easily separable in the original feature space (e.g., by a hyper-plane), but are separated by a (curved) hyper-surface. According to some embodiments, the original feature space can thus be mapped onto a higher-dimensional space that allows a linear separation by a (flat) hyper-plane, where the calculation can be simplified.

According to another advantageous embodiment of the method, providing the set of unitary operations can comprise nonlinearly transforming the data vectors into a predefined higher dimensional space using a feature map. This step can be performed after the step of providing and before the step of performing the alignment of the quantum kernel. The non-linear transformation of the data vector can represent a map into a Hilbert space (a vector space with a scalar product). The quantum kernel can be a scalar product in the Hilbert space and the dimension of the Hilbert space can depend on the underlying problem. It can be determined by the additional dimensions needed to obtain a hyper-plane separating the exemplary two classes. In most cases, at least more additional dimensions may be needed, but typically many more than the underlying feature space. The unitary operations can be symmetry operations that do not change the scalar product of the Hilbert space. By applying the unitary operations, an appropriate basis can be defined in the Hilbert space which can simplify the computation and thus speed up the problem-solving task.

According to another advantageous embodiment of the method, the set of interlinked quantum circuits can be realized by a circuit of universal quantum computing devices with a predefined number of qubits. The number of qubits is much smaller than the dimensions of the space of feature vectors. But a fairly low number of qubits can be used to encode states in a large quantum feature space (it scales with the power of qubits). The possible swapping operations acting on the qubit ensure universibility, where the swapping can be performed by intermediate steps. For these operations, particular gates can be implemented in the quantum computer.

According to another advantageous embodiment of the method, the step of performing the alignment of the quantum kernel can comprise performing, by the quantum processor, a first unitary operation using a quantum feature map being a circuit-representation of the feature map on the predefined number of qubits using a first data vector x as input and starting with all zero states of the qubits, where the quantum feature map can be parametrized, in particular over Theta.

The step of performing (see above in this paragraph) can also comprise performing a second subsequent unitary operation based on the quantum feature map on the predefined number of qubits (e.g., 20 qubits) while the dimension of the feature vector can be 10,000, for example, or similar—using a second data vector x' as input, where the second subsequent unitary operation can be an adjoint (e.g., complex-conjugate transposed, inverse) operation of the first unitary operation, building a scalar (e.g., inner) product together with a result of the first unitary operation, where a measurable output (e.g., being the trace of the result of the matrix-matrix operation) of the second unitary operation represents the quantum kernel, and solving the support vector machine task using the primal approach (instead of the dual approach) to the support vector machine task based on the optimization algorithm using the set of training data (e.g., input vectors and labels for PEGASOS) by minimizing the support vector machine task and minimizing a parameter (e.g., Theta (see below)) of the parametrized feature map. In the last step, the kernel alignment can be solved by minimizing an objective or cost function with respect to the parameter Theta (which is actually a vector). The loss function in the primal problem is associated with the inverse of the width of the gap on both sides of the hyper-plane separating the exemplary two classes.

The following definitions can be used, which are in line with the standard definition of quantum physics. The unitary operations represent symmetries in the Hilbert space and maintain all characteristics (no information is lost), but can simplify the calculation. The number of qubits can be 20 or more while the dimension of the feature space (components of the feature vector) can be, for example, 10,000 or even more. An adjoint of an operator can be defined as follows. A quantum state can be denoted as a "bra" or a "ket" state and when an operator acts on the ket state, its adjoint acts on the bra state and vice versa. In matrix notation, the adjoint matrix is the transposed and complex conjugate matrix. If the adjoint operator is the inverse of the operator itself, the operator is called unitary. The scalar product is also known as an inner product. The measurable output can be received by a trace over all quantum states.

According to another advantageous embodiment of the method, the parameter for the parametrized quantum feature map can be minimized using analytic quantum gradients. For example, some embodiments implement a PEGASOS (primal estimated sub-gradient solver for SVM) algorithm for the optimization. It has become apparent to the inventors of the present disclosure that this iterative algorithm implemented on a quantum computer can be very efficient in solving the underlying classification problem.

According to another advantageous embodiment of the method, the parameter for the parametrized quantum feature map is minimized using a simultaneous perturbation stochastic approximation (SPSA). One of the two minimizations is the minimization of the cost function with respect to parameter 9 of the kernel. This can be the kernel alignment and can be done during each iteration of PEGASOS in an exemplary implementation (e.g., an SPSA (simultaneous perturbation stochastic approach) algorithm). However, any other algorithm can also be used.

According to another advantageous embodiment of the method, the support vector machine task can be minimized by an iterative algorithm applied to a loss function using sub-gradients which comprise randomly selecting directions in the feature space. As set out before, the minimizations using the PEGASOS algorithm can use a randomly selected direction in which the loss function is minimized (along a sub-gradient direction). This random approach can accelerate the optimization process significantly.

According to another advantageous embodiment of the method, the loss function can be determined with a predetermined frequency during performing the iterative algorithm. There is actually no need to determine the loss function in each step of the iterative algorithm. Instead, the loss function can be determined more or less often (e.g., with a particular frequency during the iterative process). This can also speed up the process of optimizing.

According to another advantageous embodiment of the method, the randomly selecting directions can comprise, in each iteration, selecting a batch of directions. Similarly, it is also possible to perform the minimization in parallel along multiple randomly selected directions (not only a single in each iteration step). Therefore, using this batch-processing, fewer iteration steps may be needed until a desired result can be achieved.

According to another advantageous embodiment, the method can further comprise receiving, by the digital processor, a set of test data, where each member of the set of test data can represent a test data vector (x) and a test label (y) identifying the respective member to be part of either the first class or the second class. It may be noted that these test data can be different from the original training data. The test data can be used to test how good the training really was.

Hence, the method in this embodiment can also comprise predicting, by the quantum processor, labels of the test data using the aligned quantum kernel, and comparing, by the digital processor, the predicted labels with the received test labels to evaluate the quantum kernel of the support vector machine task. The test data can be of the same type as the training data (e.g., the label of each feature vector of the test data is known and can thus be used for benchmarking the result of the training process). Therefore, the result of the step of predicting can be used to determine the quality of the aligned quantum kernel. An acceptable aligned quantum kernel can have a rate of false classification (e.g., with the wrong label y) below a predetermined acceptance threshold or can reach the desired result in shorter time.

According to another advantageous embodiment, the method, can further comprise providing, by a digital processor, another set of unitary operations adapted for acting on a zero state of qubits of a universal quantum circuit, thus defining another quantum kernel, performing, by another quantum processor comprising a set of interlinked quantum circuits, an alignment of the other quantum kernel using an optimization algorithm (e.g., also here PAGASOS can be used) based on the other set of training data on a primal problem approach of the support vector machine task, and predicting, by the other quantum processor, other labels of the test data using the aligned other quantum kernel, and comparing, by the digital processor, the predicted labels with predicted other labels to evaluate the quantum kernel compared to the other quantum kernel.

It may be noted that the other quantum kernel can be implemented differently on the physical existing qubit structure. Consequently, different kernel mapping can be compared, tested, and evaluated against each other.

It may also be noted that another quantum processor can actually be the same hardware circuits, although they can be interconnected and differently linked.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

FIG. 2 shows a flow diagram of another method for optimizing a quantum kernel for a support vector machine task, in accordance with some embodiments of the present disclosure.

FIG. 8 shows a PEGASOS algorithm, in accordance with some embodiments of the present disclosure.

FIG. 11*a* and FIG. 11*b* show exemplary qubit operations that can be used in some embodiments of the present disclosure.

FIG. 13 shows an example computing environment to which the quantum support vector machine system in FIG. 12 can be linked to.

DETAILED DESCRIPTION

Figure 1:
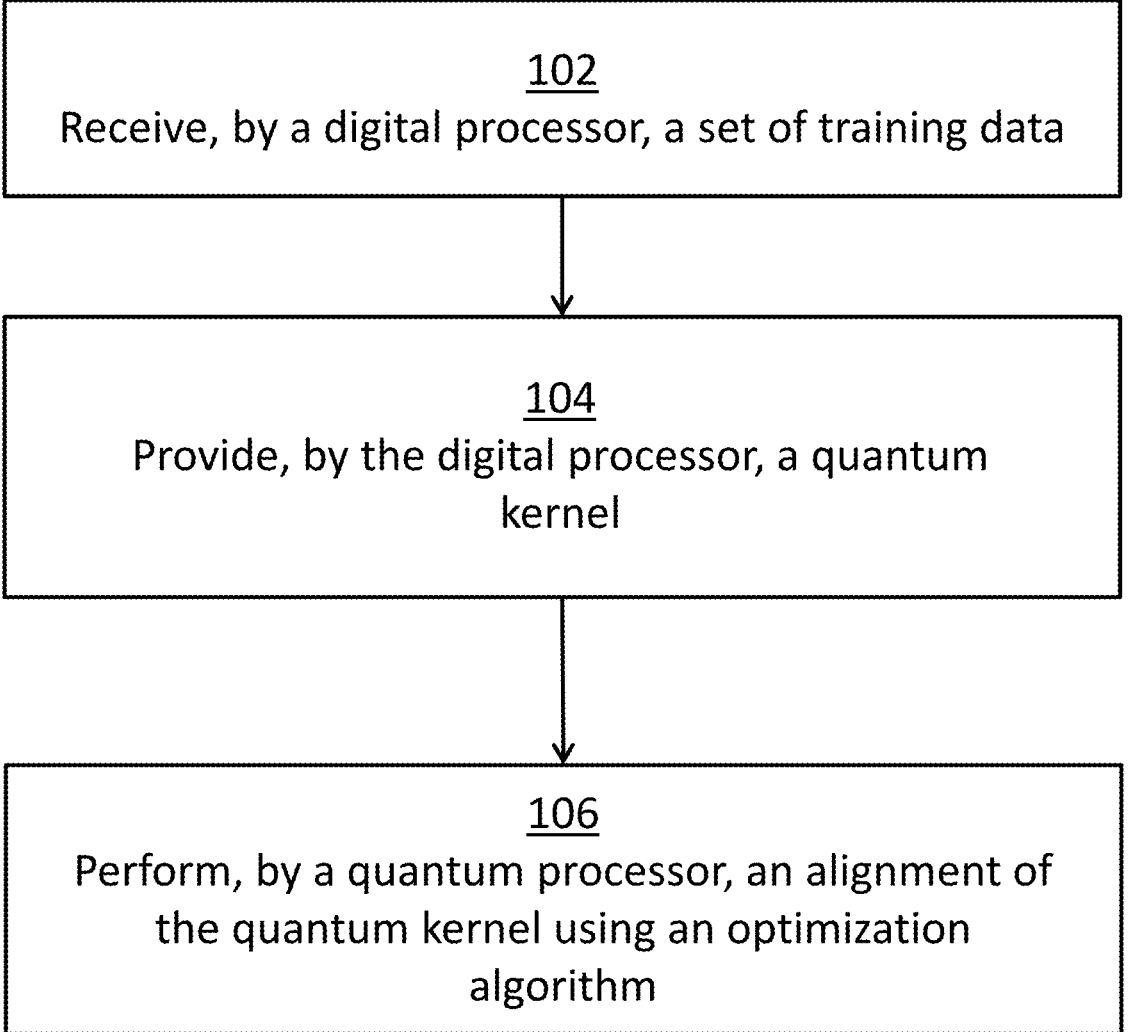
FIG. 1 shows a flow diagram of a method for optimizing a quantum kernel for a support vector machine task, in accordance with some embodiments of the present disclosure.

In the context of this description, the following technical conventions, terms and/or expressions can be used:

The term "optimizing" can be used in the sense of aligning, in particular aligning optimizing the kernel to solve a support vector machine task using a quantum computing circuit.

The term "quantum kernel" can denote a kind of transformation required for solving complex problems—in particular those for support vector machine tasks—using quantum circuits. Transformation kernels for classical support vector machine algorithms are well researched. However, when moving into the quantum computing world, there is no general understanding which kind of kernel can be useful for a specific problem. Hence, research focusses currently on finding "good" kernels in order to be used by quantum computing devices.

The term "support vector machine" can denote the well-known term for a machine or algorithm for separating multidimensional vectors from each other in order to perform a regression analysis or to classify the different vectors into different classes. The support vector machine approach is used to find a (or more) hyper-plane in the plurality of vector data that "best" separates the data points into the given number of classes.

The term "digital processor" can denote a classical binary processor, typically operating according to the van-Neumann architecture. Examples can be implemented as 8, 16, and 32 bit controllers or 32, 48, 64, and 128 bit universal and freely programmable processors, like those from INTEL or IBM POWER processors or Z-processors.

The term "training data" can denote a group of vectors to be used to train a machine-learning model in order to predict outcomes (e.g., labels). The training data also comprise the wanted outcome in form of labels relating to the different data points.

The term "class" (in particular a class of a classificator) can denote a category into which an unknown data point (e.g., a vector) input to a trained machine-learning model can be categorized or classified.

The term "unitary operation" can denote an operation for which the adjoint operator is the inverse of the operator itself, the operator is called unitary.

The term "zero-state of qubit" can denote a ground status of a qubit (e.g., a qubit in a non-exited status).

The term "universal quantum circuit" can denote a general-purpose plurality of quantum devices which can be freely programmed. The contrast to a universal quantum circuit would be a quantum circuit being designed for only limited transformations.

The term "quantum kernel" can denote a measurement of a distance in the Hilbert space or, mathematically speaking, the expectation value of a transition of a status x to x'.

The term "quantum processor" can denote a plurality of universal quantum circuits with interlinking connections and a predefined architecture, where the quantum circuits or quantum devices can be programmed according to the concept of universal quantum circuits.

The term "set of interlinked quantum circuit" can denote the architecture underlying the connections between individual quantum circuits.

The term "primal problem approach" can denote here the solution of a support vector machine task in a specific form so that the function should be minimized. In contrast to the primary problem approach is the dual problem approach for the same task. The transition from the dual problem approach to the primary problem approach can be achieved by eliminating the constraints in the dual problem approach. Hence, a maximization task is transformed to a minimization task.

The term "PEGASOS algorithm" or "primal estimated sub-gradient solver for a support vector machine" can denote a specific algorithm for solving a support vector machine task. It is based on a simple and effective stochastic sub-gradient descent approach for a classification of data points (e.g., vectors) in a multidimensional space which are typically non-linearly separable.

The term "non-linearly separable data vectors" can denote data points of data vectors which, for example, can be separated into two groups in a 2-dimensional space by a simple line. Dependencies can be much more complex, especially in high dimensional rooms.

The term "higher dimensional space" can denote a space with at least one dimension more than the next lower dimensional space.

The term "feature map" can denote here a function transforming a vector from and in-dimensional space into an $n+m$-dimensional space, wherein $m>0$.

The term "qubit" (a combination of quantum and bit) can represent the basic unit of quantum information processing. It can be seen as the quantum version of a classic binary bit physically realized with a two-state device. Hence, the qubit can be seen as a two-state (or two-level) quantum-mechanical system behaving according to quantum mechanic rules. One example can be the spin of the electron in which the two levels can be taken as spin up and spin down. Another example can be a polarization of a single photon. Important concepts of qubits are entanglement in superposition.

The term "quantum feature map" can denote a unitary encoding of a classical data vector into a quantum state.

The term "is parametrized" can denote that a parameter value may not be allowed to have indefinitely different values, but more or less discrete values which can be addressed by the parameter of its parameterization.

The term "adjoint operation" can denote, in case of matrices, a complex-conjugate transposed (e.g., inverse operation).

The term "scalar product" can denote the inner product of two vectors, resulting in a scalar number.

The term "measurable output" can denote physically and microscopically detectable signals at output terminals of the related qubit circuits. Typically, such signals can be detected using microwaves. Microwave signals can also be used to microscopically influence the behavior of certain cubit circuits, and thus triggering the behavior (e.g., the quantum transformations) of the cubit circuit.

The term "simultaneous perturbation stochastic approximation" can refer to SPSA, the known algorithmic method for optimizing systems with multiple unknown parameters. The algorithm type is one of stochastic approximation. It has been used successfully in simulating large-scale population models, adaptive modeling, simulation optimization and atmospheric modeling. It is a descent method that may involve finding global minima that shares this property with other methods such as simulation and annealing. Its main feature is the gradient approximation that requires only two measurements of the objective function regardless of the dimension of the optimization problem.

The term "fault-tolerant quantum processor" can denote a type of quantum computing machine which may be able to stabilize quantum statuses more or less infinitively (e.g., long enough for a stable operation of the quantum device). Currently, noise disturbs stable quantum statuses so that error correction qubits can be required to overcome problems with random and non-appropriate changes of statuses of single qubits.

The term "loss function" can denote the well-known term from machine-learning in which a loss function value can be built during each iteration of the learning cycle and for each data point. The value of the loss function can be used in a back-propagation loop in order to tune parameter values of the nodes of (e.g., an artificial neural network).

The term "sub-gradients" can denote a plurality of gradient line (in 2-dimensional space, otherwise also multidimensional curves) at points at which a function is not differentiatable (e.g., at a point a function has a kink).

In the following, a detailed description of the figures will be given. All instructions in the figures are schematic. Firstly, a block diagram of an embodiment of a method for optimizing a quantum kernel for a support vector machine task is given. Afterwards, further embodiments, as well as embodiments of the quantum support vector machine system for optimizing a quantum kernel for a support vector machine task will be described.

FIG. 1 shows a flow diagram of a method 100 for optimizing a quantum kernel for a support vector machine task, in accordance with some embodiments of the present disclosure. The optimization can also be interpreted as evaluating or aligning the kernel for the SVM.

The method 100 comprises receiving, 102, by a digital processor, a set of training data, each member of the set representing a data vector (x) and a label (y) identifying the respective member to be part of either a first class or a second class. Providing, 104, by the digital processor, a quantum kernel comprising a set of unitary operations adapted for acting on a zero state of qubits of a universal quantum circuit. Performing, 106, by a quantum processor comprising a set of interlinked quantum circuits, an alignment (e.g., optimization) of the quantum kernel using an optimization algorithm (e.g., PAGASOS) based on the set of training data on a primal problem approach—in contrast to the dual approach—of the support vector machine task.

FIG. 2 shows a flow diagram of a more detailed method 200 for optimizing a quantum kernel for a support vector machine task, in accordance with some embodiments of the present disclosure. The method 200 comprises receiving, 202, by the digital processor the data vectors (x) of the set of training data which are non-linearly separable data vectors by using the support vector machine. Then, the method

200 comprises non-linearly transforming, 204, the data vectors into a predefined higher dimensional space using a feature map. The set of interlinked quantum circuits is thereby realized by a circuit of universal quantum computing devices with a predefined number of qubits, and the performing, 206, the alignment of the quantum kernel comprises performing, by the quantum processor, a first unitary operation using a quantum feature map being a circuit-representation of the feature map on the predefined number of qubits using a first data vector x as input and starting with all zero states of the qubits, wherein the quantum feature map is parametrized.

The method 200 also comprises performing, 208, a second subsequent unitary operation based on the quantum feature map on the predefined number of qubits using a second data vector x' as input, where the second subsequent unitary operation is an adjoint operation of the first unitary operation.

The method 200 also comprises building (not shown) a scalar product together with a result of the first unitary operation, where a measurable output of the second unitary operation represents the quantum kernel, and thereby solving the support vector machine task (also not shown) using the primal approach to the support vector machine task based on the optimization algorithm using the set of training data, by minimizing the support vector machine task and minimizing a parameter of the parametrized feature map.

Figure 3:
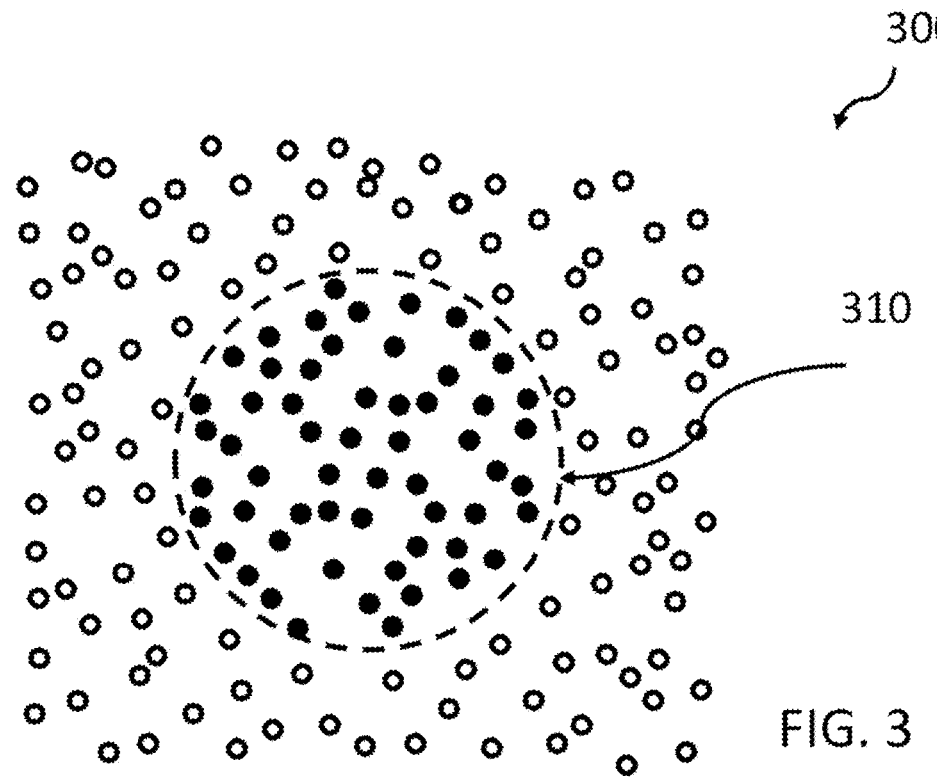
FIG. 3 shows an original feature space.

FIG. 3 shows the original feature space 300, wherein each point corresponds to a feature vector $x_i$. The coordinates in the feature space 300 corresponds to particular features of the underlying problem. There are two classes of feature vectors depicted: a first set of feature vectors indicated by solid dots, and a second set of feature vectors indicated by hollow dots. Both sets are separated by the circle 310, where the first set is inside the circle 310, and the second set is outside of the circle 310.

This arrangement of feature vectors illustrates the underlying problem of the original feature space. There is no linear separation possible between the two classes of feature vectors. Instead, both classes are only separable by a non-planar hyper-surface, which in general will not be single connected. This makes the mathematical treatment of the classification difficult.

Figure 4:
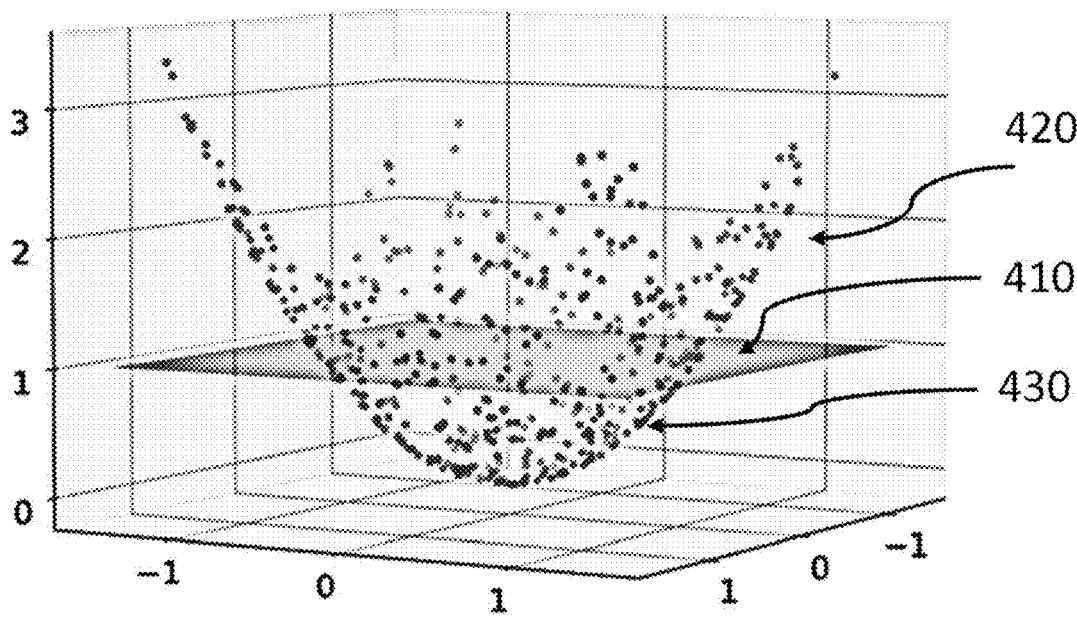
FIG. 4 shows mapping the original feature space shown in FIG. 3 into a higher dimensional space.

FIG. 4 shows how, according to some embodiments, the problem is mitigated by mapping the original feature space, as shown in FIG. 3, into a higher dimensional space, thereby allowing the separation of the features vectors by a (flat) hyper-plane 410. For this simplified case, the feature vector x is an element in $\mathbb{R}^2$ (Euclidean 2D space) and the 3-dimensional feature map of FIG. 4 can, for example, be written as:

$$(\phi)(x) = \left( x_1, x_2, x_1^2 + x_2^2 \right) \in \mathbb{R}^3$$

In the example of FIG. 4, only one additional dimension (the vertical direction) is needed to linearize the problem, for example, to separate the feature vectors into a first set 430 below the hyper-plane 410 and into a second set 420 above the hyper-plane 410. It is understood that in general the hyper-plane can have any orientation in the mapped feature space and that its dimension will in general be significantly larger than the original feature space.

As set out before, the concrete mapping $\varphi(x)$ might be very complicated depending strongly on the underlying problem. However, as described in more detail below, some embodiments rely on utilizing the kernel and thus do not need to know the exact mapping $\Phi(x)$. This represents a major advantage of embodiments and a kernel k for the feature space of FIG. 4 can be written as:

$$k(x, x') = \phi(x) \cdot \phi(x') \tag{2}$$

$$= x \cdot x' - \|x\|^2 \|x'\|^2$$

The flat hyper-plane can be defined by its normal vector w, wherein its absolute value $\|w\|$ is the inverse distance to the closest feature vectors which are named as support vectors. The purpose of the SVM is to find the vector w with the largest margin and thus with a minimal $\|w\|$. The large margin will ensure that the classification produces high quality results. In addition to the minimization of w, there are additional constraints taken into account. The constraints ensure that the hyper-plane shall be determined in the way that all training data are separated into two classes labeled by $y=\pm1$. It is understood that the last condition can also be relaxed to some extent by introducing a bias parameter, which is well-known to someone skilled in the art.

Based on this, the primal SVM problem without alignment parameter can be given by:

$$\min_{w\in\mathbb{R}^s}\left\{\frac{\lambda}{2}\|w\|^2 + \sum_{i=1}^{M}\max\{0, 1 - y_i(w^T\varphi(x_i))\}\right\}, \tag{3}$$

where M is the dimension of the original feature space and the term $\lambda$ provides a regularization and the second term is the sum over the hinge losses of data points in the training set. The SVM problem exists also in a dual formulation in which the constraints are taken into account by Lagrange multiplier. In this case, however, the minimization in w will be replaced by a maximization of the dual variable.

So far, it was the classical SVM problem. However, some embodiments rely on the quantum SVM solved with a quantum kernel alignment. For this, the classical feature maps $\varphi(x)$ are replaced by parameterized quantum feature maps $\psi_\theta(x)$, where $\theta$ is the kernel parameter. Therefore, in equation (3), the classical feature map $\varphi(x)$ is replaced by $\psi_\theta(x)$ and an additional minimization is carried out with respect to the kernel parameter $\theta$. As a result, some embodiments solve the quantum SVM problem as a min-min-problem, which provides a significant advantage over conventional algorithms.

Figures 5, 6:
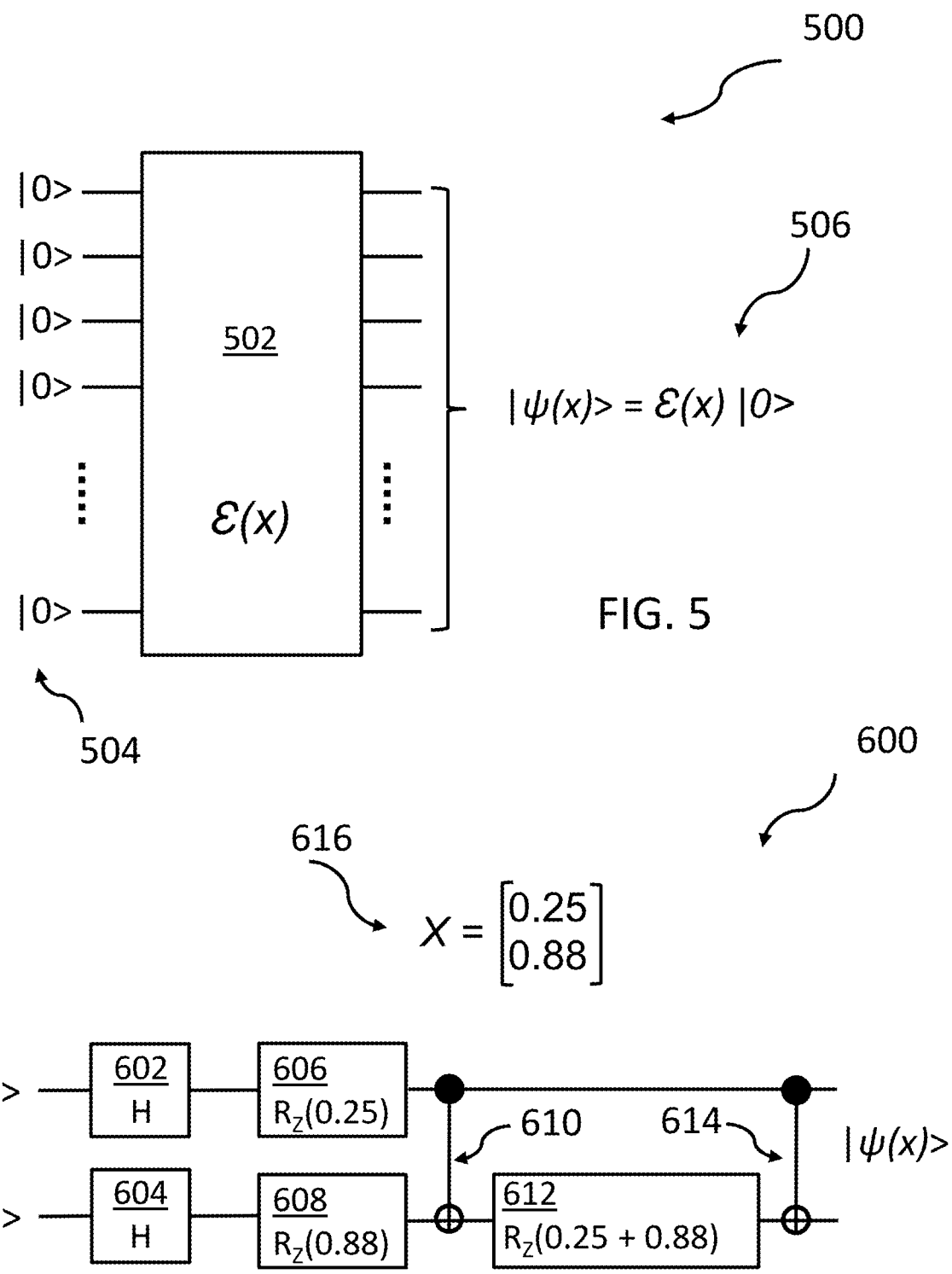
FIG. 5 shows an encoding of the quantum feature map, in accordance with some embodiments of the present disclosure.
FIG. 6 illustrates a concrete encoding to generate the quantum feature map, in accordance with some embodiments of the present disclosure.

FIG. 5 shows an embodiment of encoding 500 of the quantum feature map $\psi_\theta(x)$ 506 on a quantum computer. The quantum feature map $\psi_\theta(x)$ is encoded by acting with an operator $\varepsilon(x)$ 502 on the zero states 504. The operator 502 includes the quantum circuits implemented in the quantum computer as well as a set of unitary operations (e.g., associated with the kernel parameter $\theta$). The quantum kernel is then defined by:

$$k_{\theta_1,\theta_2}(x, y) = |\langle\psi_{\theta_1}(x)|\psi_{\theta_2}(y)\rangle|^2, \tag{4}$$

where x and y are here two feature vectors and $\theta_1$, $\theta_2$ are the respective alignment parameters.

FIG. 6 illustrates a concrete encoding 600 to generate the quantum feature map $\psi(x)$ from two qubits by a sequence of unitary transformations and interlinked quantum circuits acting on the zero state. In the exemplary case, the (original) feature vector x 616 has the components 0.25 and 0.88, and the quantum feature map is encoded as follows: On the first zero-state acts a first Hadamard transformation 602 followed by a unitary transformation 606 with an argument of 0.25 (=first component of the feature vector). On the second zero-state acts a second Hadamard transformation 604 followed by a unitary transformation 608 with an argument of 0.88 (=second component of the feature vector). The unitary transformation on each qubit can be represented by an SU(2) transformation parameterized by three 2×2 Pauli matrizes X, Y, Z with respective parameters corresponding to the feature vectors (SU(2) are the special unitary transformation of complex dimension 2). The purpose of the Hadamard transformation is to initialize the zero-state before special, x-dependent, unitary transformations are applied.

Next, two controlled-NOT operations (implemented by CNOT gates) are performed (compare 610 and 614), and a unitary transformation 612 with an argument of 0.25+0.88 is applied in between.

Figure 7:
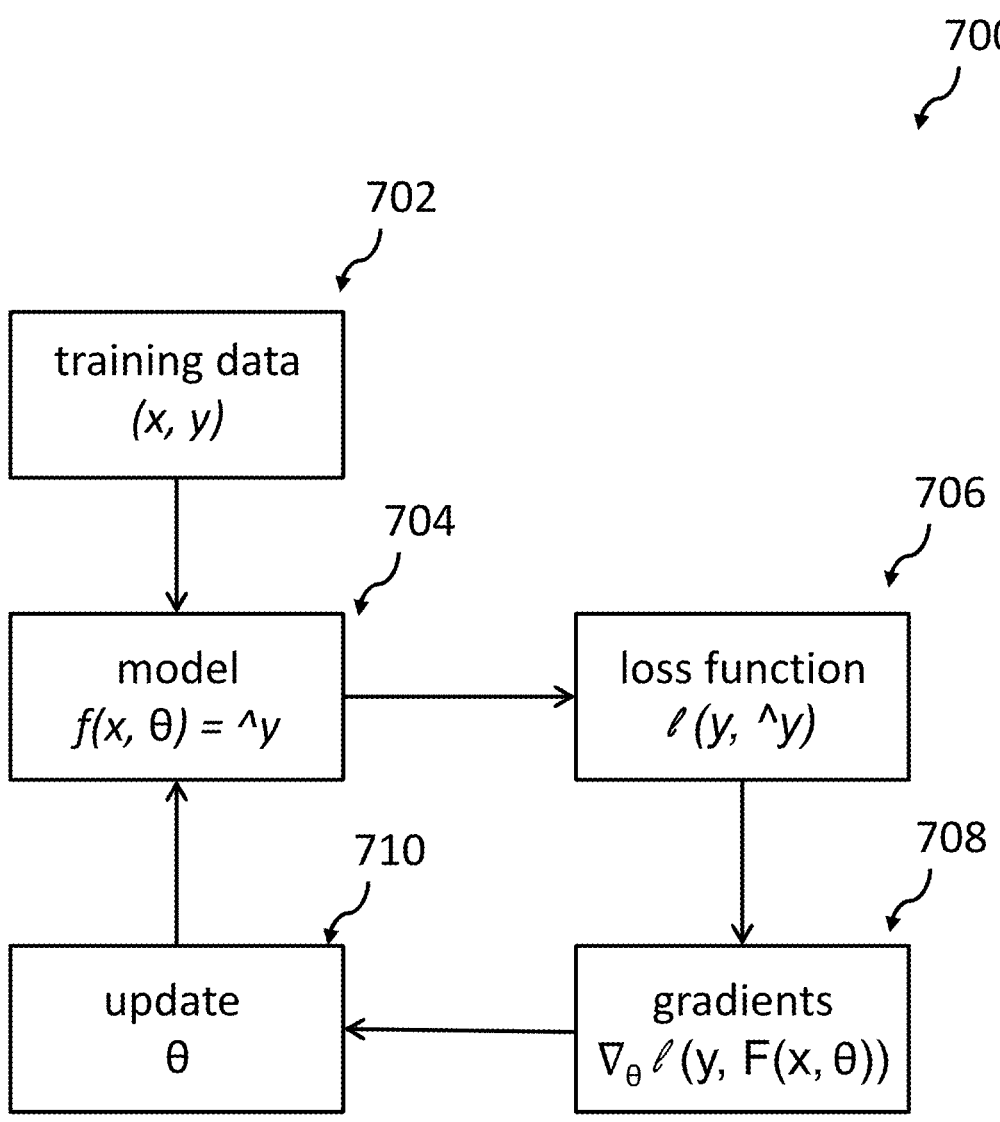
FIG. 7 illustrates a scheme for implementing a machine-learning model on a quantum computer, in accordance with some embodiments of the present disclosure.

FIG. 7 illustrates a scheme 700 for implementing a machine-learning on a quantum computer, which can be utilized for the SVM according to embodiments.

At step 702, training data is provided. The training data is a set of feature vectors x for which the labels y are known.

At step 704, a model is provided that generates a prediction $\hat{y}$ based on a given feature vector x and a kernel parameter $\theta$. The kernel parameter $\theta$ has in general a vector with many components that need to be determined during the machine-learning process. This step is implemented on the quantum computer that is able to determine the prediction very efficiently.

At step 706, a loss function is defined that measures the "incorrectness" of the prediction $\hat{y}$ by comparing the result with the known label y of the training data. This loss function shall be iteratively minimized to improve the prediction. This step can be performed by a classical processor.

At step 708, utilizing the (sub-) gradient approach, the loss function is minimized with respect to the kernel parameters $\theta$. For example, the steepest gradient can be used to approach the minimum faster. Additionally, or alternatively, the minimization can also be performed along randomly chosen sub-gradient directions. Also, this step can efficiently be performed using a quantum computer that calculates the quantum kernel defining the model.

At step 710, the kernel parameters $\theta$ are updated. This step can be performed by a classical processor.

In the next iterative step, at 704, the updated kernel parameters $\theta$ are inserted into the model and the process repeats.

The machine-learning algorithms can be terminated after a predetermined number of iterations or when the calculated loss function is below a predetermined accuracy threshold.

FIG. 8 shows the PEGASOS algorithm 800 that is implemented in some embodiments.

In lines 1 . . . 4, the inputs are defined (a set of M training data $x_i$ with L labels $y_i$). Further, the positive regularization parameter C corresponds to $\lambda$ in equation (3) and is predetermined.

In line 5, the parameterized quantum kernel k is defined, which depends on two kernel parameter vectors $\theta_1$, $\theta_2$, which will be optimizing in the algorithm.

In line 6, the initial the kernel parameter $\theta_1$ and $\theta_2$ are defined. This vector has dimension d.

In lines 7 and 8, two step numbers $\tau$, $\tau_{in}$ are defined, wherein $\tau$ defines the total number of iteration steps. This number can be determined based on a benchmarking determining the quality of the classification. The number $\tau_{in}$ defines a number of initialization steps.

In lines 10 to 24, the r iterations are carried out. At a first step, at line 11, a random direction $i_r$ (defining one trainings data) is selected. At line 12, it is determined whether the hinge losses (see second term in eq. (3)) contributes or not. If not, the algorithm continues with lines 21, 22, where the parameter $\alpha$ is set to zero and the next value for $\theta$ is assigned to the starting value defined in line 6. If the hinge loss contributes for the randomly selected direction it, then for all iteration $t<\tau_{in}$, the subsequent value of $\theta_{t+1}$ will be assigned to have the same value as the previous one. This is in total $\tau_{in}$ initializations. Later, when $t>\tau_{in}$, at lines 15 and 16 the hinge loss is minimized for $\theta_r$. Thus, these $\theta$-values are iteratively modified. At the end, the two minimizations are carried out in parallel.

According to further embodiments, in the step of randomly selecting direction $i_r$, not only a single direction is selected, but multiple directions (batch of directions) can be selected. Then, all the selected directions can be processed in parallel.

According to further embodiments, the step of minimizing the loss function (in line 16) is not in each iteration step, but less frequently, for example, only after a predetermined number of iterations (e.g., after 2, 3, . . . iterations).

Figure 9:
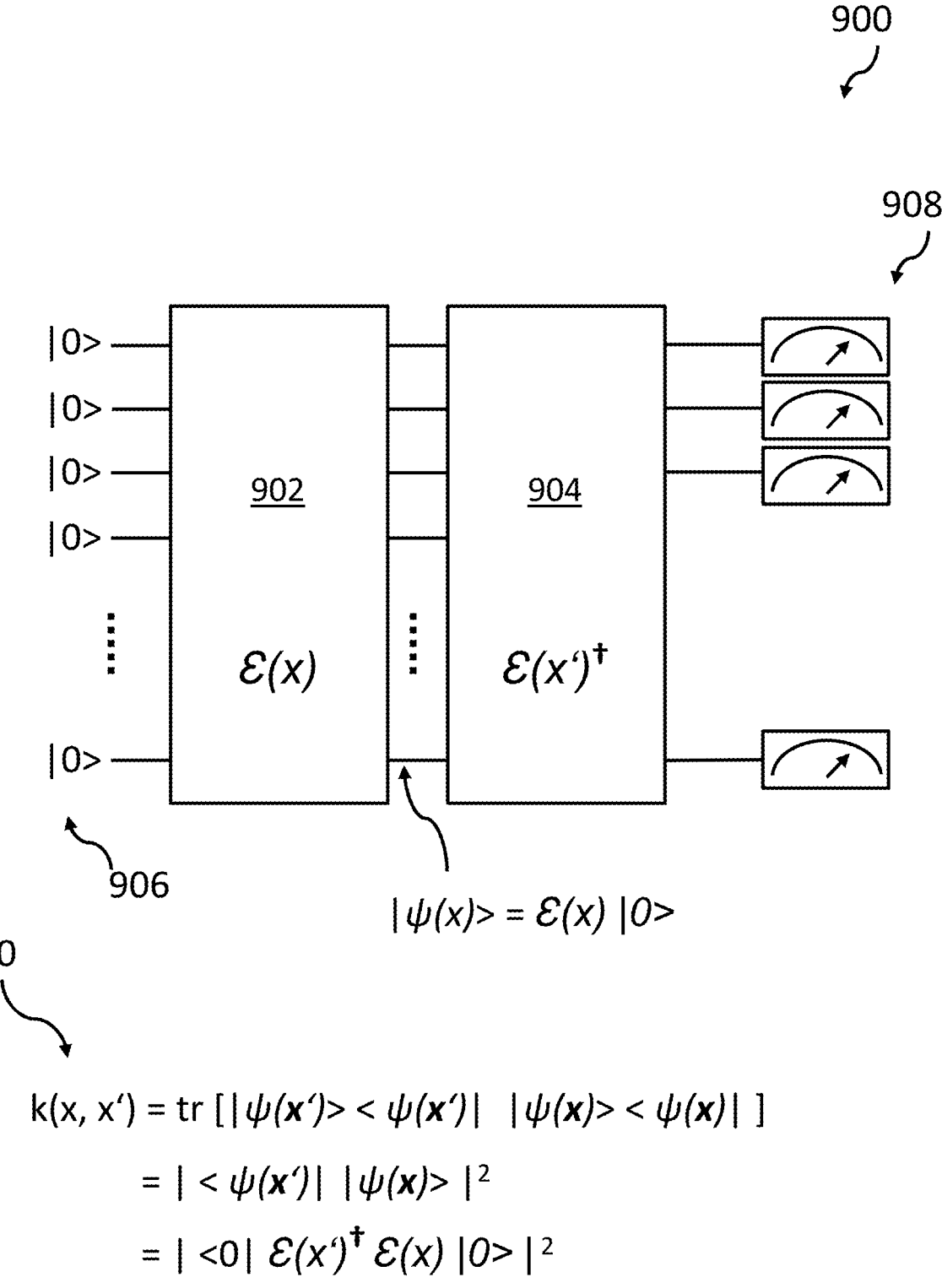
FIG. 9 shows the quantum computation of the kernel k as inner product over the quantum feature maps ψ for different arguments, in accordance with some embodiments of the present disclosure.

FIG. 9 shows in more detail the quantum calculation 900 of the kernel k 910 as inner product over the quantum feature maps ψ for different arguments (feature vectors x, x'). As set out before (cp. FIG. 4), on the quantum computer the quantum feature map ψ is generated by the operator 902 acting on the zero states 906 for the qubits. An example for this operator was given in FIG. 6. To derive the kernel, the adjoint operator 904 is applied on the quantum feature map ψ with a different argument x'. Finally, a measurement 908 is carried out to determine the (scalar) values of the kernel k at the arguments x, x'.

Figure 10:
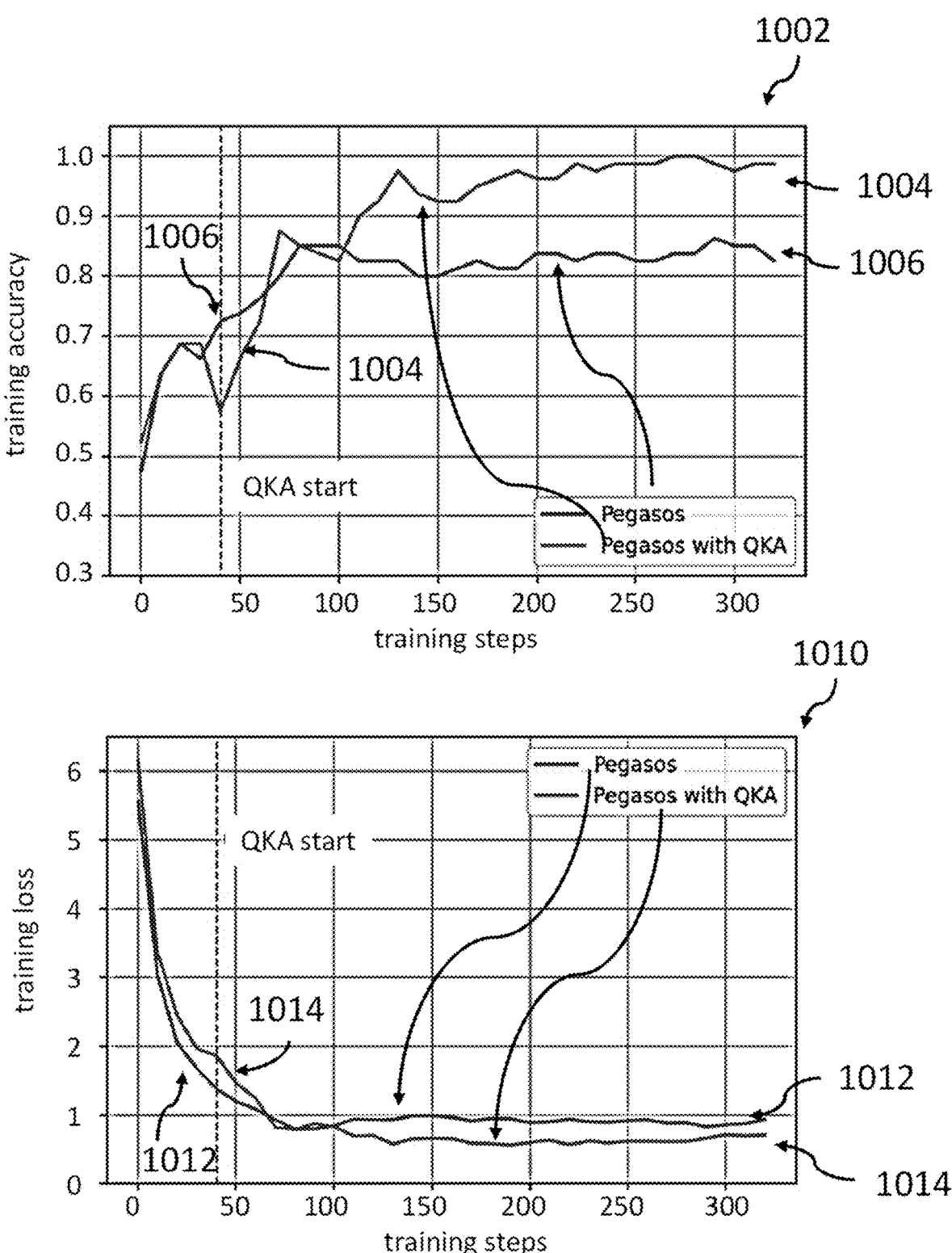
FIG. 10 illustrates experimental advantages when solving the SVM classification problem with a quantum kernel alignment.

FIG. 10 illustrates advantages when solving the SVM classification problem with a quantum kernel alignment as implemented according to some embodiments. The plots 1002 compare the training accuracy of the PEGASOS algorithm with quantum kernel alignment (see plot 1004) and without quantum kernel alignment (see plot 1006). Plots 1010 compare the corresponding training losses of the PEGASOS algorithm with quantum kernel alignment (see plot 1014) and without quantum kernel alignment (see plot 1012). The training is initialized without kernel alignment, and the dashed vertical line indicates the time at which quantum kernel alignment starts by optimizing the kernel parameters.

Apparently, the quantum kernel alignment (see plot 1004) yields already an accuracy, which is close to 1 at about 120 training steps, whereas the conventional algorithm (see plot 1006) does not exceed an accuracy of 0.9—even after 300 training steps. The same is true for the training loss, these embodiments (see plot 1014) lower the losses much faster than the conventional algorithm without quantum kernel alignment (see plot 1012).

Therefore, these embodiments need significantly less training steps to achieve reliable results. Also, in the long run for many more training steps, these embodiments provide a constant higher accuracy. This allows to test various kernels and to find very good kernels within a short period of time.

Figure 11B:
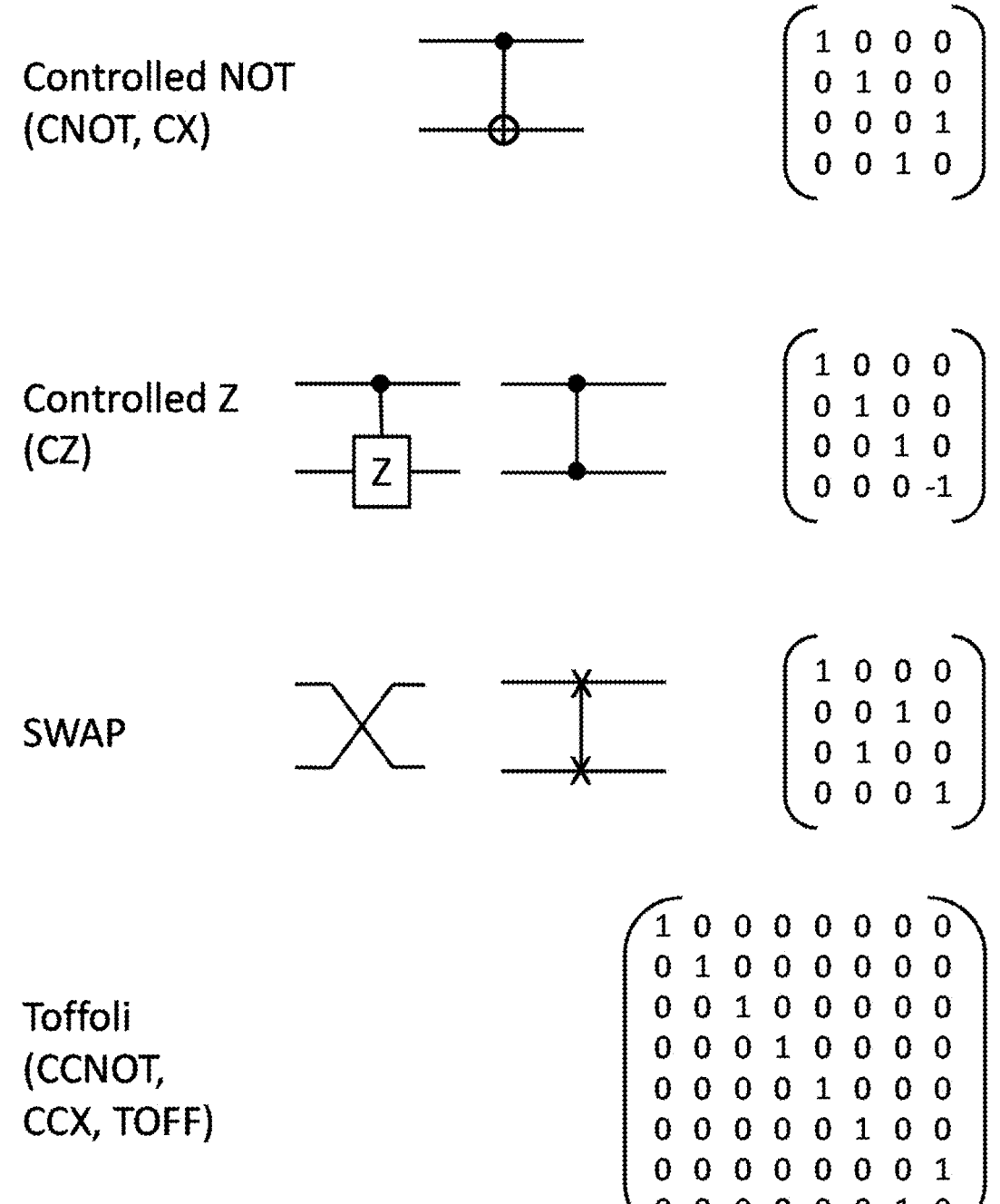

FIG. 11a and FIG. 11b show possible matrix representations of the unitary operations implemented according to embodiments. For example, the Pauli matrices (X, Y, Z) are realized as X-, Y-, Z-gates acting on one qubit of the quantum computer. They represent rotations of the 2-dimensional complex space defined for each qubit. The kernel parameter θ, for example, can be implemented in the quantum computer by adding corresponding gates corresponding to SU(2)-rotations with the arguments θ. The Hadamard gate corresponds also to a unitary operation involving one qubit and is used to initialize the zero state (mixed states are generated). The gates S, P, and T are mathematically phase operation that change the phase of one of the two states of one qubit.

More complex operations implemented by circuits in the quantum computer are the 2-qubit gates: Controlled Not (CNOT) gate and the Controlled Z (CZ) gate, which can likewise be represented by the depicted matrices. The SWAP gate exchanges two qubits whereas the Toffoli-gate is an exemplary three qubits gate.

FIG. 11a and FIG. 11b show exemplary qubit operations that can be used in embodiments, in particular to define qubit operation of quantum circuits when defining the quantum feature map.

Figure 12:
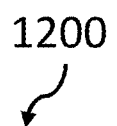
FIG. 12 shows a block diagram of an embodiment of the inventive quantum support vector machine system for optimizing a quantum kernel for a support vector machine task, in accordance with some embodiments of the present disclosure.

FIG. 12 shows a block diagram of an embodiment of the quantum support vector machine system 1200 for optimizing a quantum kernel for a support vector machine task. The system 1200 comprises a computer system comprising one or more digital processors 1202, one or more computer-readable memories 1204 operatively coupled to the one or more digital processors 1202. Thereby, the one or more computer-readable memories 1204 store computer readable program instructions, which, when executed by the processor enable the one or more processors to receive, by the one or more digital processors 1202, a set of training data, each member of the set representing a data vector (x) and a label (y) identifying the respective member to be part of either a first class or a second class.

The one or more processors 1202 are further enabled to provide a set of unitary operations adapted for acting on a zero state of qubits of a universal quantum circuit and thus defining a quantum kernel, and perform, by a quantum processor comprising a set of interlinked quantum circuits, an alignment of the quantum kernel using an optimization algorithm based on the set of training data on a primal problem approach of the support vector machine task.

It shall also be mentioned that all functional units, modules, and functional blocks (in particular, the processor 1202, the memory 1204, the receiver 1206, and the quantum processor 1208) can be communicatively coupled to each other for signal or message exchange in a selected 1:1 manner. Alternatively, the functional units, modules and functional blocks can be linked to a system internal bus system 1210 for a selective signal or message exchange.

It can also be mentioned that the digital processor(s) of FIG. 12 can be used together with, as a replacement for, or instead of, the processor(s) described in the next figure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently, or in a manner at least partially overlapping in time.

A computer program product embodiment (CPP embodiment or CPP) is a term used in the present disclosure to describe any set of one, or more, storage media (also called mediums) collectively included in a set of one, or more, storage devices that collectively include machine readable code corresponding to instructions and/or data for performing computer operations specified in a given CPP claim. A storage device is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 13:
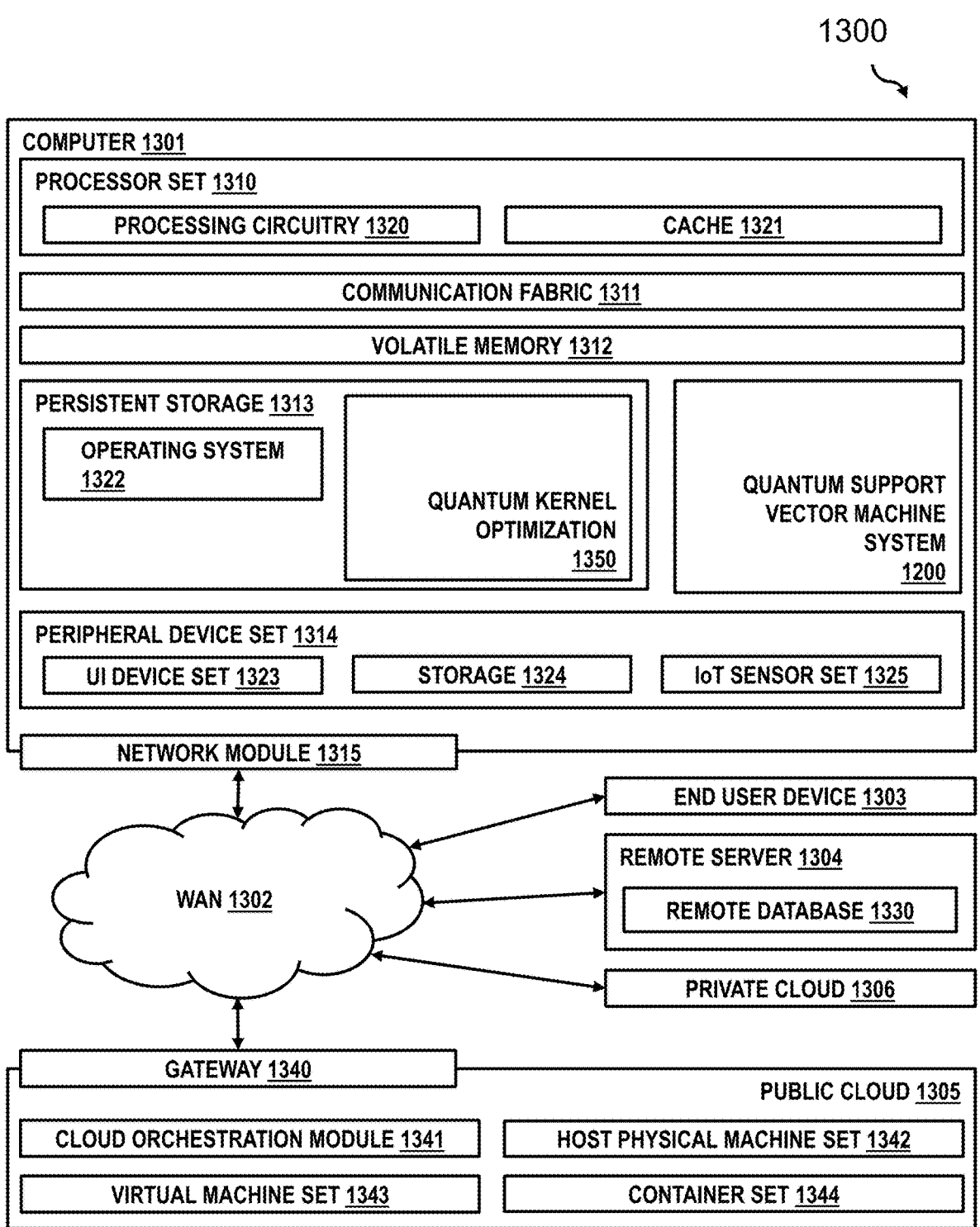

FIG. 13 shows a computing environment 1300 comprising an example of an environment for the execution of at least some of the computer code involved in performing the inventive methods, such as computer code in block 1350 for preforming quantum kernel optimization (the method for optimizing a quantum kernel for a support vector machine task described earlier).

In addition to block 1350, computing environment 1300 includes, for example, computer 1301, wide area network (WAN) 1302, end user device (EUD) 1303, remote server 1304, public cloud 1305, and private cloud 1306. In this embodiment, computer 1301 includes processor set 1310 (including processing circuitry 1320 and cache 1321), communication fabric 1311, volatile memory 1312, persistent storage 1313 (including operating system 1322 and block 1350, as identified above), peripheral device set 1314 (including user interface (UI), device set 1323, storage 1324, and Internet of Things (IoT) sensor set 1325), and network module 1315. Remote server 1304 includes remote database 1330. Public cloud 1305 includes gateway 1340, cloud orchestration module 1341, host physical machine set 1342, virtual machine set 1343, and container set 1344.

COMPUTER 1301 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1330. As is well understood in the art of computer technology, and depending upon the technology, performance of a computer-implemented method can be distributed among multiple computers and/or between multiple locations. On the other hand, in this presentation of computing environment 1300, detailed discussion is focused on a single computer, specifically computer 1301, to keep the presentation as simple as possible. Computer 1301 can be located in a cloud, even though it is not shown in a cloud in FIG. 13. On the other hand, computer 1301 is not required to be in a cloud except to any extent as can be affirmatively indicated.

PROCESSOR SET 1310 includes one, or more, computer processors of any type now known or to be developed in the future. Processing circuitry 1320 can be distributed over multiple packages, for example, multiple, coordinated integrated circuit chips. Processing circuitry 1320 can implement multiple processor threads and/or multiple processor cores. Cache 1321 is memory that is located in the processor chip package(s) and is typically used for data or code that should be available for rapid access by the threads or cores running on processor set 1310. Cache memories are typically organized into multiple levels depending upon relative proximity to the processing circuitry. Alternatively, some, or all, of the cache for the processor set can be located "off chip." In some computing environments, processor set 1310 can be designed for working with qubits and performing quantum computing.

Computer readable program instructions are typically loaded onto computer 1301 to cause a series of operational steps to be performed by processor set 1310 of computer 1301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1321 and the other storage media discussed below. The program instructions, and associated data, are accessed by processor set 1310 to control and direct performance of the inventive methods. In computing environment 1300, at least some of the instructions for performing the inventive methods can be stored in block 1350 in persistent storage 1313.

COMMUNICATION FABRIC 1311 is the signal conduction paths that allow the various components of computer 1301 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths and/or wireless communication paths.

VOLATILE MEMORY 1312 is any type of volatile memory now known or to be developed in the future. Examples include dynamic type random access memory (RAM) or static type RAM. Typically, the volatile memory is characterized by random access, but this is not required unless affirmatively indicated. In computer 1301, the volatile memory 1312 is located in a single package and is internal to computer 1301, but, alternatively or additionally, the volatile memory can be distributed over multiple packages and/or located externally with respect to computer 1301.

PERSISTENT STORAGE 1313 is any form of non-volatile storage for computers that is now known or to be developed in the future. The non-volatility of this storage means that the stored data is maintained regardless of whether power is being supplied to computer 1301 and/or directly to persistent storage 1313. Persistent storage 1313 can be a read only memory (ROM), but typically at least a portion of the persistent storage allows writing of data, deletion of data and re-writing of data. Some familiar forms of persistent storage include magnetic disks and solid-state storage devices. Operating system 1322 can take several forms, such as various known proprietary operating systems or open-source Portable Operating System Interface type operating systems that employ a kernel. The code included in block 1350 typically includes at least some of the computer code involved in performing the inventive methods.

PERIPHERAL DEVICE SET 1314 includes the set of peripheral devices of computer 1301. Data communication connections between the peripheral devices and the other components of computer 1301 can be implemented in various ways, such as Bluetooth connections, Near-Field Communication (NFC) connections, connections made by cables (such as universal serial bus (USB) type cables), insertion type connections (e.g., secure digital (SD) card), connections made though local area communication networks and even connections made through wide area networks such as the internet. In various embodiments, UI device set 1323 can include components such as a display screen, speaker, microphone, wearable devices (such as goggles and smart watches), keyboard, mouse, printer, touchpad, game controllers, and haptic devices. Storage 1324 is external storage, such as an external hard drive, or insertable storage, such as an SD card. Storage 1324 can be persistent and/or volatile. In some embodiments, storage 1324 can take the form of a quantum computing storage device for storing data in the form of qubits. In embodiments where computer 1301 is required to have a large amount of storage (for example, where computer 1301 locally stores and manages a large database) then this storage can be provided by peripheral storage devices designed for storing very large amounts of data, such as a storage area network (SAN) that is shared by multiple, geographically distributed computers. IoT sensor set 1325 is made up of sensors that can be used in Internet of Things applications. For example, one sensor can be a thermometer and another sensor can be a motion detector.

NETWORK MODULE 1315 is the collection of computer software, hardware, and firmware that allows computer 1301 to communicate with other computers through WAN 1302. Network module 1315 can include hardware, such as modems or WI-FI signal transceivers, software for packetizing and/or de-packetizing data for communication network transmission, and/or web browser software for communicating data over the internet. In some embodiments, network control functions and network forwarding functions of network module 1315 are performed on the same physical hardware device. In other embodiments (e.g., embodiments that utilize software-defined networking (SDN)), the control functions and the forwarding functions of network module 1315 are performed on physically separate devices, such that the control functions manage several different network hardware devices. Computer readable program instructions for performing the inventive methods can typically be downloaded to computer 1301 from an external computer or external storage device through a network adapter card or network interface included in network module 1315.

WAN 1302 is any wide area network (for example, the internet) capable of communicating computer data over non-local distances by any technology for communicating computer data, now known or to be developed in the future. In some embodiments, the WAN can be replaced and/or supplemented by local area networks (LANs) designed to communicate data between devices located in a local area, such as a WI-FI network. The WAN and/or LANs typically include computer hardware such as copper transmission cables, optical transmission fibers, wireless transmission, routers, firewalls, switches, gateway computers and edge servers.

END USER DEVICE (EUD) 1303 is any computer system that is used and controlled by an end user (for example, a customer of an enterprise that operates computer 1301), and can take any of the forms discussed above in connection with computer 1301. EUD 1303 typically receives helpful and useful data from the operations of computer 1301. For example, in a hypothetical case where computer 1301 is designed to provide a recommendation to an end user, this recommendation would typically be communicated from network module 1315 of computer 1301 through WAN 1302 to EUD 1303. In this way, EUD 1303 can display, or otherwise present, the recommendation to an end user. In some embodiments, EUD 1303 can be a client device, such as thin client, heavy client, mainframe computer, desktop computer and so on.

REMOTE SERVER 1304 is any computer system that serves at least some data and/or functionality to computer 1301. Remote server 1304 can be controlled and used by the same entity that operates computer 1301. Remote server 1304 represents the machine(s) that collect and store helpful and useful data for use by other computers, such as computer 1301. For example, in a hypothetical case where computer 1301 is designed and programmed to provide a recommendation based on historical data, then this historical data can be provided to computer 1301 from remote database 1330 of remote server 1304.

PUBLIC CLOUD 1305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1305 is performed by the computer hardware and/or software of cloud orchestration module 1341. The computing resources provided by public cloud 1305 are typically implemented by virtual computing environments that run on various computers making up the computers of host physical machine set 1342, which is the universe of physical computers in and/or available to public cloud 1305. The virtual computing environments (VCEs) typically take the form of virtual machines from virtual machine set 1343 and/or containers from container set 1344. It is understood that these VCEs can be stored as images and can be transferred among and between the various physical machine hosts, either as images or after instantiation of the VCE. Cloud orchestration module 1341 manages the transfer and storage of images, deploys new instantiations of VCEs and manages active instantiations of VCE deployments. Gateway 1340 is the collection of computer software, hardware, and firmware that allows public cloud 1305 to communicate through WAN 1302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1306 is similar to public cloud 1305, except that the computing resources are only available for use by a single enterprise. While private cloud 1306 is depicted as being in communication with WAN 1302, in other embodiments a private cloud can be disconnected from the internet entirely and only accessible through a local/ private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1305 and private cloud 1306 are both part of a larger hybrid cloud.

It should also be mentioned that the quantum support vector machine system 1200 (compare FIG. 12) for optimizing a quantum kernel for a support vector machine task can be an operational sub-system of the computer 1301 and can be attached to a computer-internal bus system.

The terminology used herein is for the purpose of describing particular embodiments only and is not intended to limit the disclosure. As used herein, the singular forms a, an, and the are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the disclosure in the form disclosed. Many modifications and variations will be apparent to those of ordinary skills in the art without departing from the scope and spirit of the disclosure. The embodiments are chosen and described in order to best explain the principles of the disclosure and the practical application, and to enable others of ordinary skills in the art to understand the disclosure for various embodiments with various modifications, as are suited to the particular use contemplated.

In general, the inventive concept of the present disclosure can be summarized by the following clauses:

Clause 1: a computer implemented method for optimizing a quantum kernel for a support vector machine task, the method comprising receiving, by a digital processor, a set of training data, each member of the set of training data representing a data vector (x) and a label (y) identifying the respective member to be part of either a first class or a second class, providing, by the digital processor, the quantum kernel comprising a set of unitary operations adapted for acting on a zero state of qubits of a universal quantum circuit, and performing, by a quantum processor comprising a set of interlinked quantum circuits, an alignment of the quantum kernel using an optimization algorithm based on the set of training data on a primal problem approach of the support vector machine task.

Clause 2: the method according to clause 1, wherein the optimization algorithm is a PEGASOS algorithm, which, when applied to a primal problem approach, includes two minimizations.

Clause 3: the method according to clause 1 or 2, wherein the data vectors (x) of the set of training data are non-linearly separable data vectors by using the support vector machine.

Clause 4: the method according to any of the preceding clauses, wherein the providing the set of unitary operations comprises nonlinearly transforming the data vectors into a predefined higher dimensional space using a feature map.

Clause 5: the method according to clause 4, wherein the set of interlinked quantum circuits is realized by a circuit of universal quantum computing devices with a predefined number of qubits.

Clause 6: the method according to clause 5, wherein performing the alignment of the quantum kernel comprises performing, by the quantum processor, a first unitary operation using a quantum feature map being a circuit-representation of the feature map on the predefined number of qubits using a first data vector x as input and starting with all zero states of the qubits, wherein the quantum feature map is parametrized, performing a second subsequent unitary operation based on the quantum feature map on the predefined number of qubits using a second data vector x' as input, wherein the second subsequent unitary operation is an adjoint operation of the first unitary operation, building a scalar product together with a result of the first unitary operation, wherein a measurable output of the second unitary operation represents the quantum kernel, and solving the support vector machine task using the primal approach to the support vector machine task based on the optimization algorithm using the set of training data, by minimizing the support vector machine task and minimizing a parameter of the parametrized feature map.

Clause 7: the method according to clause 6, wherein the parameter for the parametrized quantum feature map is minimized using analytic quantum gradients.

Clause 8: the method according to clause 6, wherein the parameter for the parametrized quantum feature map is minimized using a simultaneous perturbation stochastic approximation.

Clause 9: the method according to clause 6, wherein the support vector machine task is minimized by an iterative algorithm applied on a loss function using sub-gradients which comprise randomly selecting directions in the feature space.

Clause 10: the method according to clause 9, wherein during performing the iterative algorithm the loss function is determined with a predetermined frequency.

Clause 11: the method according to clause 9, wherein the randomly selecting directions comprise in each iteration selecting a batch of directions.

Clause 12: the method according to any of the preceding clauses, the method further comprising:

receiving, by the digital processor, a set of test data, each member of the set of test data representing a test data vector (x) and a test label (y) identifying the respective member to be part of either the first class or the second class, predicting, by the quantum processor, labels of the test data using the aligned quantum kernel, and comparing, by the digital processor, the predicted labels with the received test labels to evaluate the quantum kernel of the support vector machine task.

Clause 13: the method according to clause 12, further comprising:

providing, by a digital processor, another set of unitary operations adapted for acting on a zero state of qubits of a universal quantum circuit, thus defining another quantum kernel, performing, by another quantum processor comprising a set of interlinked quantum circuits, an alignment of the other quantum kernel using an optimization algorithm based on the other set of training data on a primal problem approach of the support vector machine task, predicting, by the other quantum processor, other labels of the test data using the aligned other quantum kernel, and comparing, by the digital processor, the predicted labels with predicted other labels to evaluate the quantum kernel compared to the other quantum kernel.

Clause 14: a quantum support vector machine system for optimizing a quantum kernel for a support vector machine task, the system comprises:

a computer system comprising one or more digital processors and a quantum processor, one or more computer-readable memories operatively coupled to the one or more digital processors and the quantum processor, wherein the one or more memories store computer readable program instructions, which, when executed by the one or more digital processors or quantum processor, enable the one or more digital processors or quantum processor to:

receive, by the one or more digital processors, a set of training data, each member of the set of training data representing a data vector (x) and a label (y) identifying the respective member to be part of either a first class or a second class, provide, by the one or more digital processors, the quantum kernel comprising a set of unitary operations adapted for acting on a zero state of qubits of a universal quantum circuit, and perform, by the quantum processor comprising a set of interlinked quantum circuits, an alignment of the quantum kernel using an optimization algorithm based on the set of training data on a primal problem approach of the support vector machine task.

Clause 15: the system according to clause 14, wherein the optimization algorithm is a PEGASOS algorithm, which, when applied to a primal problem approach, comprises two minimizations.

Clause 16: the system according to clause 14 or 15, wherein the one or more processors, during providing the set of unitary operations, are also enabled to nonlinearly transforming the data vectors into a predefined higher dimensional space using a feature map.

Clause 17: the method according to clause 16, wherein the set of interlinked quantum circuits is realized by a circuit of universal quantum computing devices with a predefined number of qubits.

Clause 18: the method according to clause 17, wherein the one or more digital processors, during performing the alignment of the quantum kernel, is also enabled to:

perform, by the quantum processor, a first unitary operation using a quantum feature map being a circuit-representation of the feature map on the predefined number of qubits using a first data vector x as input and starting with all zero states of the qubits, wherein the quantum feature map is parametrized, perform a second subsequent unitary operation based on the quantum feature map on the predefined number of qubits using a second data vector x' as input, wherein the second subsequent unitary operation is an adjoint operation of the first unitary operation, build a scalar product together with a result of the first unitary operation, wherein a measurable output of the second unitary operation represents the quantum kernel, and solve the support vector machine task using the primal approach to the support vector machine task based on the optimization algorithm using the set of training data, by minimizing the support vector machine task and minimizing a parameter of the parametrized feature map.

Clause 19: the system according to clause 18, wherein the parameter for the parametrized quantum feature map is minimized using analytic quantum gradients.

Clause 20: a computer program product for optimizing a quantum kernel for a support vector machine task the computer program product comprising a computer readable storage medium having program instructions embodied therewith, the program instructions being executable by one or more digital processors and/or quantum processors or controllers to cause the one or more digital processors and/or quantum processors to:

receive, by the one or more digital processors, a set of training data, each member of the set representing a data vector (x) and a label (y) identifying the respective member to be part of either a first class or a second class, provide, by the one or more digital processors, the quantum kernel comprising a set of unitary operations adapted for acting on a zero state of qubits of a universal quantum circuit, and perform, by the quantum processor comprising a set of interlinked quantum circuits, an alignment of the quantum kernel using an optimization algorithm based on the set of training data on a primal problem approach of the support vector machine task.

What is claimed is:

1. A computer implemented method for optimizing a quantum kernel for a support vector machine task, comprising:

receiving, by a digital processor, a set of training data, each member of the set of training data representing a data vector (x) and a label (y) identifying the respective member to be part of either a first class or a second class;

providing, by the digital processor, the quantum kernel comprising a set of unitary operations adapted for acting on a zero state of qubits of a universal quantum circuit; and performing, by a quantum processor comprising a set of interlinked quantum circuits, an alignment of the quantum kernel using a primal estimated sub-gradient solver for a support vector machine (PEGASOS) algorithm based on the set of training data on a primal problem approach of the support vector machine task, wherein the primal problem approach involves solving in parallel a min-min-problem comprising minimizing the support vector machine task and minimizing a parameter of a parametrized quantum feature map.

2. The method according to claim 1, wherein data vectors (x) of the set of training data are non-linearly separable data vectors by using the support vector machine.

3. The method according to claim 1, wherein the set of unitary operations are further adapted for:

nonlinearly transforming the data vectors into a predefined higher dimensional space using a feature map.

4. The method according to claim 1, wherein the set of interlinked quantum circuits is realized by a circuit of universal quantum computing devices with a predefined number of qubits.

5. The method according to claim 4, wherein performing the alignment of the quantum kernel further comprises:

performing, by the quantum processor, a first unitary operation using the parametrized quantum feature map, which is a circuit-representation of the feature map on the predefined number of qubits using a first data vector x as input and starting with all zero states of the qubits;

performing a second subsequent unitary operation based on the parametrized quantum feature map on the predefined number of qubits using a second data vector x' as input, wherein the second subsequent unitary operation is an adjoint operation of the first unitary operation;

building a scalar product together with a result of the first unitary operation, wherein a measurable output of the second subsequent unitary operation represents the quantum kernel; and solving the support vector machine task using the primal problem approach to the support vector machine task.

6. The method according to claim 5, wherein the parameter for the parametrized quantum feature map is minimized using analytic quantum gradients.

7. The method according to claim 5, wherein the parameter for the parametrized quantum feature map is minimized using a simultaneous perturbation stochastic approximation.

8. The method according to claim 5, wherein the support vector machine task is minimized by an iterative algorithm applied on a loss function using sub-gradients which comprise randomly selecting directions in the feature space.

9. The method according to claim 8, wherein during performing the iterative algorithm the loss function is determined with a predetermined frequency.

10. The method according to claim 8, wherein the randomly selecting directions comprise in each iteration selecting a batch of directions.

11. The method according to claim 1, the method further comprising:

receiving, by the digital processor, a set of test data, each member of the set of test data representing a test data vector (x) and a test label (y) identifying the respective member to be part of either the first class or the second class;

predicting, by the quantum processor, labels of the set of test data using the aligned quantum kernel; and comparing, by the digital processor, the labels with received test labels to evaluate the quantum kernel of the support vector machine task.

12. The method according to claim 11, further comprising:

providing, by the digital processor, another quantum kernel comprising another set of unitary operations adapted for acting on a zero state of qubits of a universal quantum circuit;

performing, by another quantum processor comprising a set of interlinked quantum circuits, an alignment of the another quantum kernel using an optimization algorithm based on another set of training data on the primal problem approach of the support vector machine task;

predicting, by the another quantum processor, other labels of the set of test data using the aligned another quantum kernel; and comparing, by the digital processor, the labels with the other labels to evaluate the quantum kernel compared to the another quantum kernel.

13. A quantum support vector machine system for optimizing a quantum kernel for a support vector machine task, comprising:

a computer system comprising one or more digital processors and a quantum processor, one or more computer-readable memories operatively coupled to the one or more digital processors and the quantum processor, wherein the one or more computer-readable memories store computer readable program instructions, which, when executed by the one or more digital processors or quantum processor, enable the one or more digital processors or quantum processor to:

receive, by the one or more digital processors, a set of training data, each member of the set of training data representing a data vector (x) and a label (y) identifying the respective member to be part of either a first class or a second class;

provide, by the one or more digital processors, the quantum kernel comprising a set of unitary operations adapted for acting on a zero state of qubits of a universal quantum circuit; and perform, by the quantum processor comprising a set of interlinked quantum circuits, an alignment of the quantum kernel using a primal estimated sub-gradient solver for a support vector machine (PEGASOS) algorithm based on the set of training data on a primal problem approach of the support vector machine task, wherein the primal problem approach involves solving in parallel a min-min-problem comprising minimizing the support vector machine task and minimizing a parameter of a parametrized quantum feature map.

14. The system according to claim 13, wherein the set of unitary operations are further adapted for:

nonlinearly transforming the data vectors into a predefined higher dimensional space using a feature map.

15. The system according to claim 13, wherein the set of interlinked quantum circuits is realized by a circuit of universal quantum computing devices with a predefined number of qubits.

16. The system according to claim 15, wherein the one or more digital processors, during performing the alignment of the quantum kernel, is further enabled to:

perform, by the quantum processor, a first unitary operation using the parametrized quantum feature map, which is a circuit-representation of the feature map on the predefined number of qubits using a first data vector x as input and starting with all zero states of the qubits;

perform a second subsequent unitary operation based on the parametrized quantum feature map on the predefined number of qubits using a second data vector x' as input, wherein the second subsequent unitary operation is an adjoint operation of the first unitary operation;

build a scalar product together with a result of the first unitary operation, wherein a measurable output of the second subsequent unitary operation represents the quantum kernel; and solve the support vector machine task using the primal problem approach to the support vector machine task.

17. The system according to claim 16, wherein the parameter for the parametrized quantum feature map is minimized using analytic quantum gradients.

18. A computer program product for optimizing a quantum kernel for a support vector machine task, comprising:

one or more computer readable storage media, and program instructions collectively stored on the one or more computer readable storage media, the program instructions configured to cause one or more digital processors or a quantum processor to:

receive, by the one or more digital processors, a set of training data, each member of the set of training data representing a data vector (x) and a label (y) identifying the respective member to be part of either a first class or a second class;

provide, by the one or more digital processors, the quantum kernel comprising a set of unitary operations adapted for acting on a zero state of qubits of a universal quantum circuit; and perform, by the quantum processor comprising a set of interlinked quantum circuits, an alignment of the quantum kernel using a primal estimated sub-gradient solver for a support vector machine (PEGASOS) algorithm based on the set of training data on a primal problem approach of the support vector machine task, wherein the primal problem approach involves solving in parallel a min-min-problem comprising minimizing the support vector machine task and minimizing a parameter of a parametrized quantum feature map.

\* \* \* \* \*